(12) United States Patent
Elflein

(10) Patent No.: US 6,390,267 B1
(45) Date of Patent: May 21, 2002

(54) CENTRAL RELEASE DEVICE FOR A HYDRAULIC CLUTCH ACTUATION SYSTEM

(75) Inventor: Stephen Elflein, Rentweinsdorf (DE)

(73) Assignee: FTE Automotive GmbH (DE)

( * ) Notice: Subject to any disclaimer, the term of this patent is extended or adjusted under 35 U.S.C. 154(b) by 0 days.

(21) Appl. No.: 09/661,172

(22) Filed: Sep. 13, 2000

(30) Foreign Application Priority Data

Sep. 15, 1999 (DE) .......................... 199 44 083

(51) Int. Cl.⁷ .................... F16D 23/14; F16D 25/08
(52) U.S. Cl. .................... 192/85 CA; 192/91 A; 192/98
(58) Field of Search ............... 192/85 CA, 91 A, 192/98, DIG. 1

(56) References Cited

U.S. PATENT DOCUMENTS

| | | |
|---|---|---|
| 4,344,516 A | 8/1982 | Kolb |
| 4,585,106 A * | 4/1986 | Shirley .............. 192/85 CA |
| 4,687,084 A * | 8/1987 | Leigh-Monstevens et al. ... 192/85 CA |
| 5,183,141 A | 2/1993 | Abe et al. |
| 5,211,099 A | 5/1993 | Grosspietsch et al. |
| 5,307,915 A | 5/1994 | Grosspietsch et al. |
| 5,655,639 A | 8/1997 | Villata |
| 5,810,145 A | 9/1998 | Thomire |
| 5,908,097 A * | 6/1999 | Grosspietsch et al. .... 192/91 A |
| 5,964,333 A | 10/1999 | Grosspietsch et al. |

FOREIGN PATENT DOCUMENTS

| | | |
|---|---|---|
| DE | 31 19 367 C1 | 12/1982 |
| DE | 43 13 346 A1 | 10/1994 |
| DE | 197 42 468 A1 | 4/1999 |
| DE | 197 54 176 A1 | 6/1999 |
| DE | 198 11 657 A1 | 9/1999 |
| EP | 0 095 841 B1 | 8/1986 |
| EP | 0 168 932 B1 | 3/1989 |
| FR | 2 745 616 | 9/1997 |
| GB | 2 112 490 A | 7/1983 |

* cited by examiner

Primary Examiner—Rodney H. Bonck
(74) Attorney, Agent, or Firm—McAndrews, Held & Malloy, Ltd.

(57) ABSTRACT

A central release device (10) for a hydraulic clutch actuation system has a housing (12) and a sleeve (16) provided with a flange (14), which together define a pressure chamber (18) for accommodating an annular piston (20), by means of which a release bearing (22) guided on the sleeve can be displaced. A spring (24), which braces the housing and the release bearing apart, subjects the housing to a force directed at the flange. According to the invention, a retaining element (28), which can be detached to operate the central release device, is provided which, when the central release device is in the non-mounted state, forms a stop for the housing and prevents this alone from moving against the force of the spring away from the flange of the sleeve beyond a predetermined amount.

11 Claims, 3 Drawing Sheets

CENTRAL RELEASE DEVICE FOR A HYDRAULIC CLUTCH ACTUATION SYSTEM

BACKGROUND OF THE INVENTION

The invention relates to a central release device for a hydraulic clutch actuation system. The invention relates in particular to a central release device of a hydraulic clutch actuation system for a motor vehicle clutch.

A conventional hydraulic clutch actuation system for motor vehicles has a master cylinder which is connected to a compensating reservoir filled with hydraulic fluid and which can be actuated via a clutch pedal. The master cylinder is hydraulically connected via a pressure line to a slave cylinder, so that the pressure produced in the master cylinder by depressing the clutch pedal can be transmitted to the slave cylinder via the fluid column in the pressure line. The release bearing of the clutch is as a result subjected by the slave cylinder to an actuating force in order to separate the clutch pressure plate from the clutch driving disc and thus the engine from the transmission of the motor vehicle.

In order to guarantee smooth clutch actuation with a small space requirement for the slave cylinder, the prior art has proposed forming the slave cylinder as an annular cylinder which is disposed around the clutch or transmission shaft and attached to the transmission. An annular piston is disposed in sliding fashion in the axial direction of the clutch or gear shaft in the annular cylinder and is connected for operation to the release bearing of the clutch. When the annular cylinder is acted upon hydraulically via the pressure line, the annular piston acts via the release bearing on the release lever of the clutch in order to release the latter. Because they are disposed concentrically with the clutch or transmission shaft, slave cylinders of this kind are also called central release devices.

The prior art is not lacking in proposals as to how such central release devices should be formed (e.g. EP 0 095 841 B1, EP 0 168 932 B1, DE 41 09 125 A1, DE 43 13 346 A1, DE 197 42 468 A1). A feature common to the central release devices considered here is the fact that they have a housing which comprises a through-bore, is cut out of a metallic material or injection moulded from a plastics material and can be attached to a transmission wall in the motor vehicle. A drawn steel sleeve is provided coaxially with the housing in the bore, this sleeve comprising at the end a flange which extends in the radial direction and is disposed between the housing and the transmission wall when the central release device is in the mounted state. In this prior art the inner circumferential face of the bore defines, together with the radial flange and the outer circumferential face of the steel sleeve, the pressure chamber containing the annular piston which is guided on the steel sleeve and provided with a sealing element.

In order to seal off the pressure chamber, an elastomeric sealing ring is generally provided between the housing and the flange of the steel sleeve. The steel sleeve is also connected in a fixed fashion at its flange to the housing by means of a screwed connection (EP 0 095 841 B1), by caulking the housing (EP 0 168 932 B1), by means of a retaining ring (DE 41 09 125 A1), by a welded joint, riveting, through-fitting or a rolling connection (DE 43 13 346 A1) or by means of a snap connection (DE 197 42 468 A1), so that the sealing ring between the housing and the flange of the steel sleeve and the sealing element at the annular piston are not accessible and therefore cannot be damaged. However this prior art has the disadvantage of entailing a high expenditure to form the connection between the housing and the flange of the steel sleeve, and this constitutes a significant proportion of the production costs of this mass-produced article.

As compared with the prior art according to EP 0 168 932 B1, which constitutes the type in question, the object of the invention is therefore to provide a simply formed central release device which can be produced more conveniently without the risk of functional problems.

SUMMARY OF THE INVENTION

This object is solved by central release device for a hydraulic clutch actuation system, with a housing and a sleeve provided with a flange, which together define a pressure chamber for accommodating an annular piston, by means of which a release bearing guided on the sleeve can be displaced, wherein a spring, which braces the housing and the release bearing apart, subjects the housing to a force directed at the flange, and a seal is provided between the housing and the flange to seal off the pressure chamber, wherein there is a retaining element, which can be detached to operate the central release device and which, when the central release device is in the non-mounted state, forms a stop for the housing and prevents the housing alone from moving against the force of the spring away from the flange of the sleeve beyond a predetermined amount.

According to the invention, given a central release device for a hydraulic clutch actuation system which comprises a housing and a sleeve provided with a flange, which together define a pressure chamber for accommodating an annular piston, by means of which a release bearing guided on the sleeve can be displaced, wherein a spring, which braces the housing and the release bearing apart, subjects the housing to a force directed at the flange, and a seal is disposed between the housing and the flange to seal off the pressure chamber, a retaining element, which can be detached to operate the central release device, is provided which, when the central release device is in the non-mounted state, forms a stop for the housing and prevents the housing alone from moving against the force of the spring away from the flange of the sleeve beyond a predetermined amount.

In other words, there is no fixed connection between the housing of the central release device and the sleeve, so that the production of the central release device is simplified overall. In this respect the invention utilises the knowledge that the systems known from the prior art for attaching the sleeve to the housing are only actually required until the central release device is mounted in the housing, as when the central release device is in the mounted state the flange of the sleeve is secured on one side between the housing of the central release device and on the other side a housing wall or a housing cover of the transmission, to which the housing of the central release device is attached, e.g. by means of screws. The detachable retaining element is provided according to the invention for the purpose of packing, storing, transporting and mounting the central release device, which element, being assisted by the claimed securement of the housing in relation to the flange of the sleeve, prevents—via the spring already provided in the prior art for reasons relating to function and noise—the seal between the housing and the flange of the steel sleeve or the sealing element at the annular piston from being accessible and in this connection damaged, which could result in leakages during operation of the central release device. The retaining element, which is to be detached to operate the central release device after it has been mounted in the motor vehicle, can advantageously be reused or is repeatedly reusable. A further advantage lies in the fact that the seal between the housing and the flange of the sleeve can easily be replaced should this appear necessary on account of material ageing, for example.

Preferably, the housing is expediently provided at its end face which is turned towards the flange of the sleeve or the flange of the sleeve is provided at its end face which is turned towards the housing with an annular groove which accommodates the seal, the thickness of which is greater in the non-deformed state than the depth of the annular groove, wherein the predetermined amount by which the housing can move away from the flange of the sleeve when the central release device is in the non-mounted state is less than or equal to the depth of the annular groove. Therefore, when the central release device is handled outside of the vehicle as mentioned, the retaining element reliably prevents the seal from sliding out of its predetermined position and being damaged between the end face of the housing and the end face, lying opposite this, at the flange of the sleeve.

There are various preferred arrangement variants for the retaining element, in which the release bearing is in each case guided on the sleeve by a sliding sleeve, which is held at the sleeve by means of a stop, and the retaining element is formed as a cross slide. According to claim 3, this cross slide can advantageously be secured positively and non-positively at the sleeve in an annular gap between the sliding sleeve and the housing. The cross slide may alternatively be secured positively and non-positively at the sliding sleeve in a groove made in the outer circumference of the sliding sleeve or at an offset made at the outer circumference of the sliding sleeve. This arrangement variant relates to central release devices in which the sliding sleeve always, i.e. even in the completely withdrawn state when lying against the stop of the sleeve, engages in the annular gap between the housing and the sleeve with its end which is turned towards the flange of the sleeve (see, e.g. EP 0 168 932 B1). According to a further alternative, the cross slide may be secured positively and non-positively at the housing in a groove made in the outer circumference of the housing or at an offset made at the outer circumference of the housing and comprises a stop face for a protective sleeve which is attached to the sliding sleeve and surrounds the housing telescopically, as known, for example, from EP 0 095 841 B1, or for an abutment, attached to the sliding sleeve, for the spring.

Preferably, the cross slide expediently comprises a handle part from which two arms extend which, viewed in a plan view, essentially form a C shape. In order to improve handling of the cross slide, the handle faces of the handle part may each be provided with a profile.

The arms of the cross slide can spring out elastically and comprise a part-cylindrical inner circumferential face, wherein the clearance between the arm ends is slightly smaller than the diameter of the part-cylindrical inner circumferential face, so that, depending on the arrangement variant, the cross slide engages behind the sleeve, the sliding sleeve or the housing like a snap connection in the mounted state. As a result, the cross slide is advantageously prevented, in a simple manner, from unintentionally separating from the central release device.

Preferably, the arm ends are provided at the sides which are turned towards one another with a respective fitting bevel, which makes it easier to fit the cross slide to the central release device.

The securing element or cross slide can be produced particularly easily and inexpensively if it consists of a plastics material. Finally, preferably, the housing of the central release device advantageously consists of a plastics material, while the sleeve is made of steel.

BRIEF DESCRIPTION OF THE DRAWINGS

The invention is explained in detail in the following on the basis of a preferred embodiment and with reference to the accompanying drawings, in which.

DETAILED DESCRIPTION OF A PREFERRED EMBODIMENT

Figure 1:
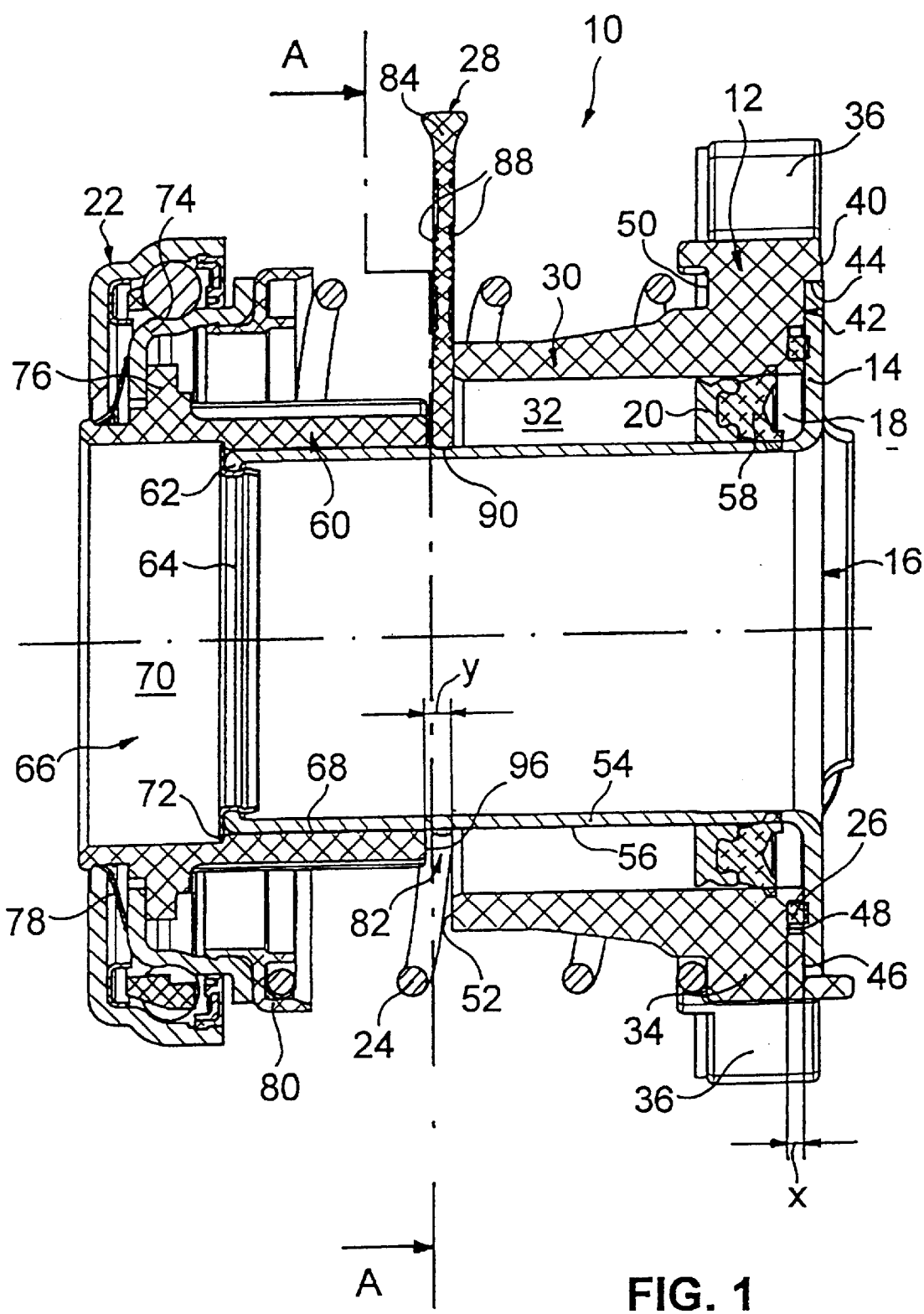
FIG. 1 is a longitudinal sectional view through a central release device formed according to the invention with mounted retaining element.

In the figures a central release device 10 for a hydraulic clutch actuation system for dry friction clutches is represented in the non-mounted state in the basic position. The central release device 10 comprises a plastics housing 12 and has a sleeve 16 which is provided with an annular radial flange 14 and is drawn from a steel sheet. The housing 12 and the sleeve 16 together define a pressure chamber 18, in which an annular piston 20 is accommodated. A release bearing 22 guided on the sleeve 16 can be displaced in a manner known per se by means of the annular piston 20 in order to release a clutch, which is not represented. The housing 12 and the release bearing 22 are braced apart by a spring 24, in the present case a helical compression spring, which subjects the housing 12 to a force directed at the flange 14. A seal 26 for sealing off the pressure chamber 18 is disposed between the housing 12 and the flange 14. A retaining element, in the represented embodiment a flat cross slide 28 preferably consisting of a plastics material, which can be detached to operate the central release device 10, forms a stop for the housing 12 when the central release device 10 is in the non-mounted state and prevents the housing 12 alone from moving against the force of the spring 24 away from the flange 14 of the sleeve 16 beyond a predetermined amount, as shall be described in detail in the following.

The housing 12 has an essentially hollow cylindrical wall portion 30 which comprises a central through-bore 32 of a constant diameter and passes at its end on the right in FIG. 1 into an attachment flange 34 which is essentially round in a plan view. According to FIG. 2, the attachment flange 34 is provided at the outer circumference with three symmetrically distributed attachment eyes 36, which serve to attach the central release device 10 to a transmission wall or transmission cover (not represented) by means of, for example, screws (not represented), which pass through the fastening eyes 36. Also provided at the housing 12 is a hydraulic connection 38, which communicates via a bore (not represented) with the pressure chamber 18 in -order to allow hydraulic fluid to be supplied to the pressure chamber 18.

The end face 40, which is remote from the wall portion 30 of the housing 12 and formed for the centred attachment of the central release device 10 to the transmission wall or transmission cover, of the attachment flange 34 is provided centrally with a centring counterbore, 42, the circumferential face 44 of which serves to radially centre the flange 14 of the sleeve 16 at the housing 12. The plane, annular end face 46 of the centring counterbore 42 comprises an annular groove 48 which is made in the axial direction and has a depth x to accommodate the annular, preferably elastomeric seal 26. The seal 26 is represented in the non-deformed state in FIG. 1 to illustrate its actual dimensions. It is obvious that the thickness of the seal 26 is greater than the depth x of the annular groove 48 by a predetermined amount in the non-deformed state, so that, when the central release device 10 is in the mounted state, in which—because it is lying in a manner not represented against the transmission wall or transmission cover—the flange 14 is pushed flatly against the end face 46 of the centring counterbore 42 of the housing 12, pressed into the annular groove 48 and reliably seals off the pressure chamber 18. The above description shows clearly that, although the sleeve 16 is centred with its flange 14 in or at the centring counterbore 42 in the housing 12, there is no fixed connection between the sleeve 16 and the housing 12.

Finally, with regard to the housing 12, which is preferably injection moulded, it is also to be noted that an essentially annular abutment 50 for the spring 24 is formed at the attachment flange 34 on the side which is remote from the centring counterbore 42, while the wall portion 30 of the housing 12 ends with a plane annular face 52, which forms a stop face for the cross slide 28, at the end, i.e. on the left side in FIG. 1.

An elongate, hollow cylindrical sleeve portion 54 adjoins the flange 14 of the sleeve 16, which portion extends coaxially with the through-bore 32 in the housing 12 over the entire length of the through-bore 32 and beyond. The clutch or transmission shaft (not represented) is guided through the sleeve portion 54 when the central release device 10 is in the mounted state. The outer circumferential face 56 of the sleeve portion 54 forms a running or guide face both for the metallic annular piston 20, to which an elastomeric sealing element 58, shown in the non-deformed state in FIG. 1, is attached on the pressure chamber side, this element lying against the through-bore 32 in the housing 12 and against the outer circumferential face 56 of the sleeve 16, and for a plastics sliding sleeve 60 carrying the release bearing 22. Finally, at the left end, which is remote from the flange 14, the sleeve 16 has a collar 62 which projects radially inwards from the sleeve portion 54 and serves to attach a sheet-metal ring 64 forming a stop for the sliding sleeve 60, as will be described.

The sliding sleeve 60, which is separated from the annular piston 20, has a stepped through-bore 66 with a portion 68 of a smaller diameter, at which the sliding sleeve 60 is guided in sliding fashion on the outer circumferential face 56 of the sleeve portion 54 such that the sliding sleeve 60 can enter the axial annular gap between the through-bore 32 in the housing 12 and the outer circumferential face 56 of the sleeve 16, so as to engage for operation with the annular piston 20 at the end. The stepped through-bore 66 also comprises at the free end of the sliding sleeve 60 a portion 70 of a greater diameter, which forms with the portion 68 of a smaller diameter an offset 72 serving as a stop face with which the sliding sleeve 60 can strike against the sheet-metal ring 64, which is attached positively and non-positively to the collar 62 of the sleeve portion 54 and projects radially outwards beyond the outer circumferential face 56 of the sleeve portion 54, although has a small radial clearance with respect to the portion 70 of the stepped through-bore 66 of a greater diameter. Once mounted, the sheet-metal ring 64 consequently holds the sliding sleeve 60 at the sleeve 16, or prevents the sliding sleeve 60 from being withdrawn from the sleeve 16.

A release bearing 22, which is known per se, is attached by means of a retaining ring 78 to the outer circumference of the sliding sleeve 60 with its inner race 74 against a shoulder 76 of the sliding sleeve 60. Finally, a further annular abutment 80, which consists of a plastics material, for the spring 24 is secured positively and non-positively to the inner race 74 of the release bearing 22.

When the central release device 10 is in the basic position which is represented, the spring 24, which is inserted in a preloaded state between the abutments 50, 80, braces the housing 12 and the release bearing 22 on the sleeve 16 apart in the axial direction such that, on the side which is on the right in FIG. 1, the housing 12 is pushed with its end face 46 or the seal 26 against the flange 14 of the sleeve 16 or the flange 14 of the sleeve 16 is pulled in the direction of the end face 46 of the housing 12, while on the side which is on the left in FIG. 1 the sliding sleeve 60 is held with its offset 72 via the abutment 80, the inner race 74 of the release bearing 22 and the retaining ring 78 against the sheet-metal ring 64 attached to the sleeve portion 54. The cross slide 28 is provided to prevent the housing 12 from unintentionally moving away from the flange 14 of the sleeve 16 against the relatively small force of the spring 24 during mounting, packing, storage or transport, in which case the seal 26 and/or the sealing element 58 could be damaged, which slide can be detached to operate the central release device 10 and in the represented embodiment secured positively and non-positively at the outer circumferential face 56 of the sleeve portion 54 of the sleeve 16 in a radial annular gap 82 of a predetermined width y between the annular face 52 of the housing 12 and the sliding sleeve 60.

Figure 2:
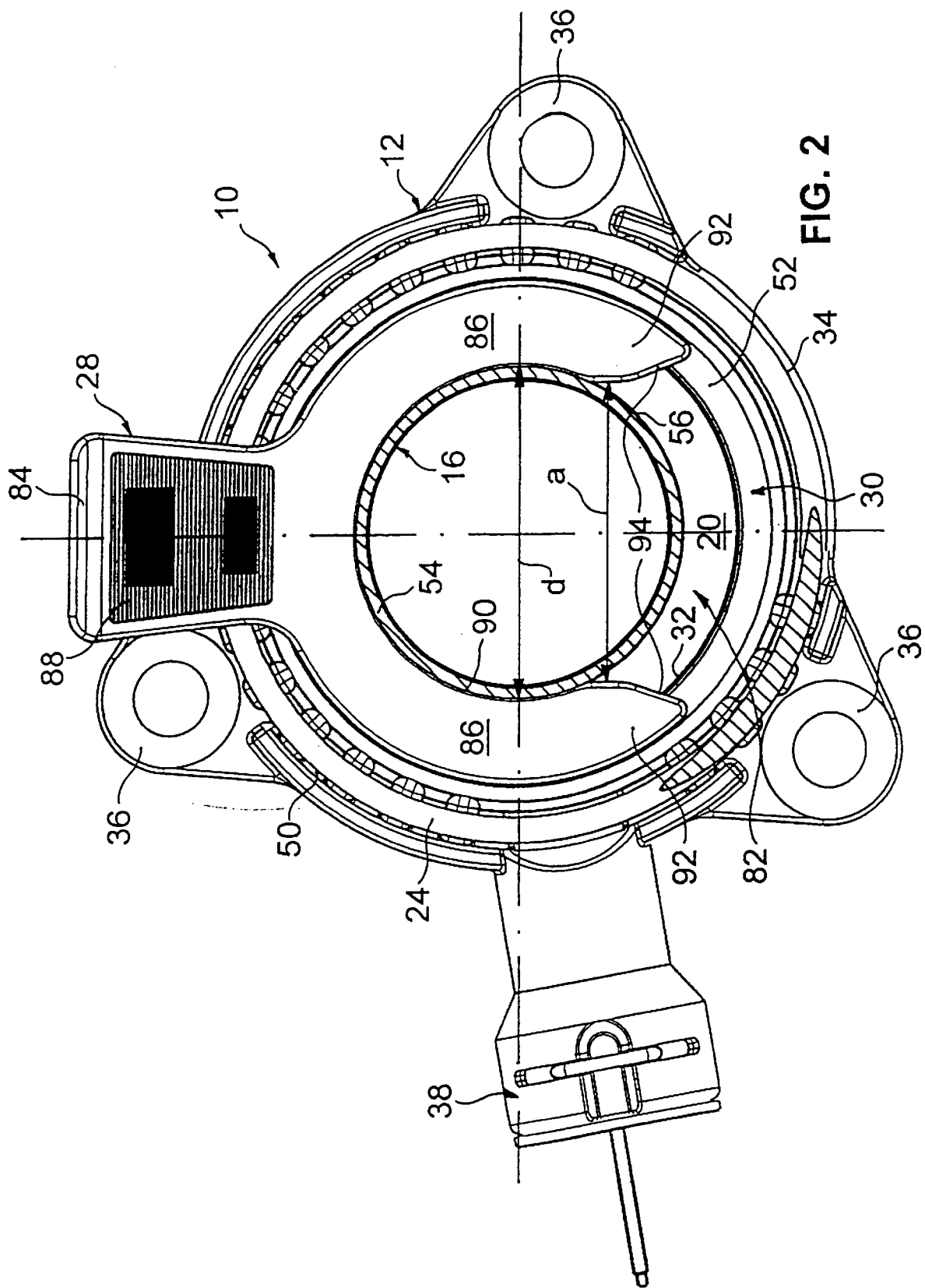
FIG. 2 is a sectional view of the central release device represented in FIG. 1 according to the intersection line A—A in FIG. 1.
Figure 3:
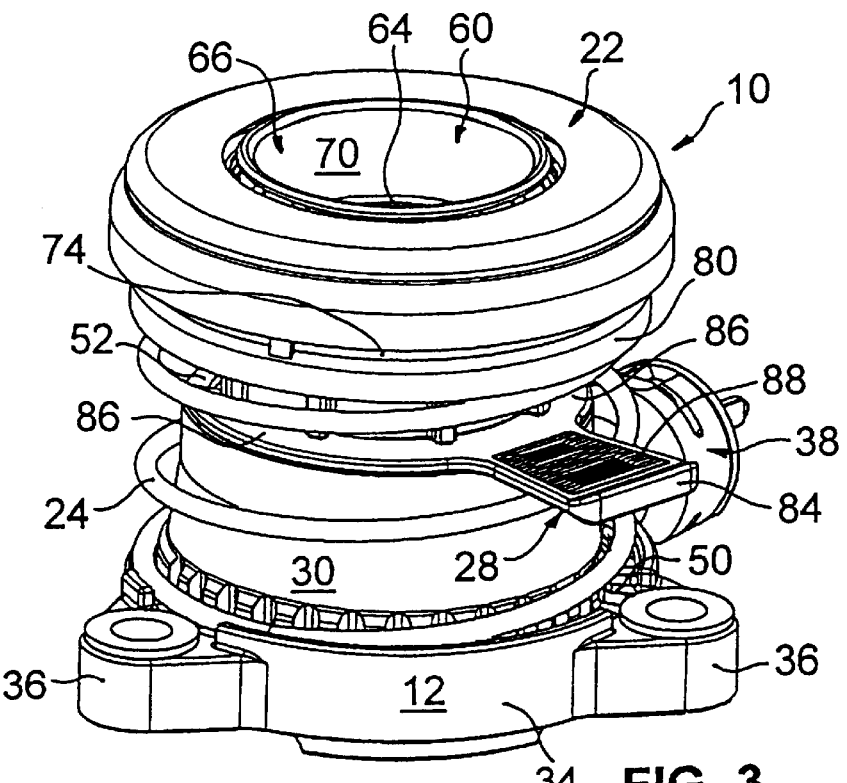
FIG. 3 is a perspective representation of the central release device shown in FIG. 1 with mounted retaining element and FIG. 4 is a perspective representation of the central release device shown in FIG. 1 with detached retaining element.
Figure 4:
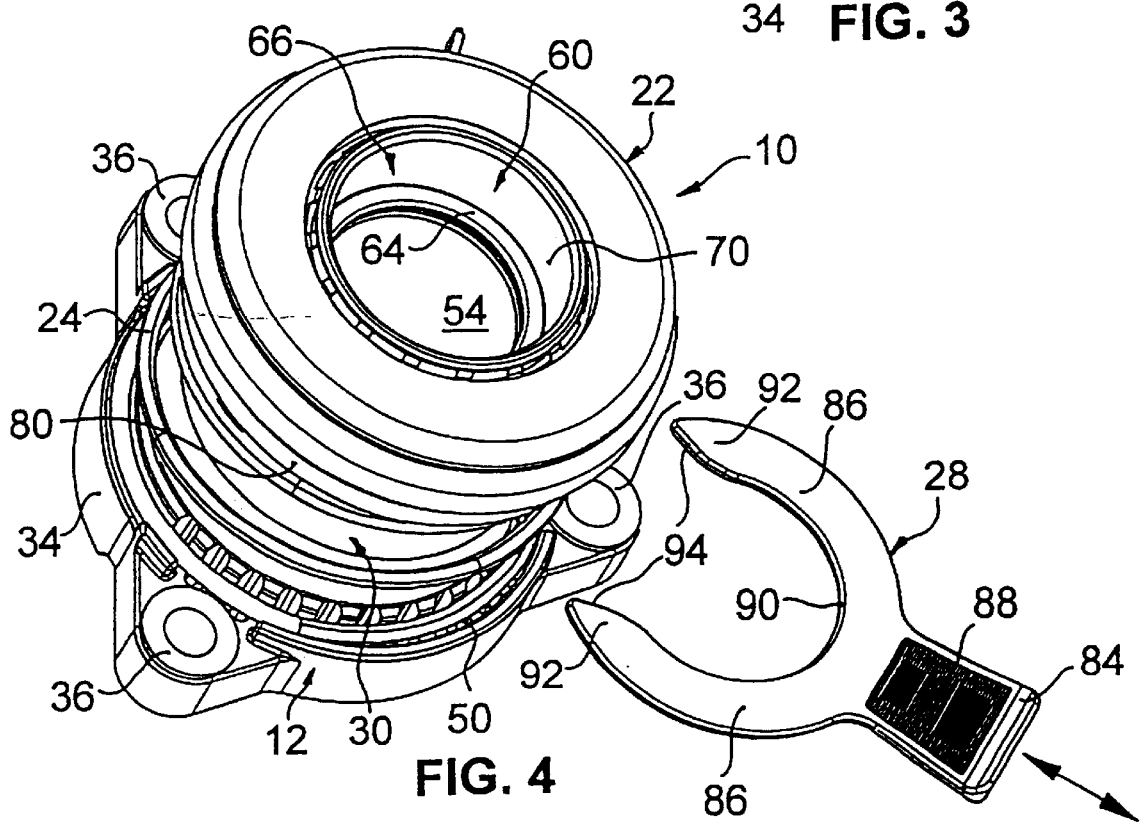

The cross slide 28, which is preferably made of a plastics material, can be seen clearly in FIGS. 2, 3 and 4. According to FIG. 2 in particular, the cross slide 28, which is rounded all over at its edges, comprises a handle part 84 from which two arms 86 extend which, viewed in a plan view, essentially form a C shape. In order to improve handling of the cross slide 28, the handle part 84, which tapers slightly in the direction of the arms 86 in a plan view, is provided on both sides with a profile 88, as shown in FIG. 1. The arms 86 of the cross slide 28, which are of an essentially constant width over their length, can spring outwards elastically and form a part-cylindrical inner circumferential face 90, the diameter d of which corresponds essentially to the diameter of the outer circumferential face 56 of the sleeve portion 54. Here the clearance a between the arm ends 92 is slightly smaller than the diameter d of the part-cylindrical inner circumferential face 90, so that the cross slide 28 engages behind the sleeve portion 54 of the sleeve 16 like a snap connection in the mounted state, as shown clearly in FIG. 2. In order to make it easier to fit the cross slide 28 in a direction perpendicular to the longitudinal axis of the central release device 10 and indicated by a double arrow in FIG. 4, the arm ends 92 are provided at the sides which are turned towards one another with a respective fitting bevel 94.

In order to mount it at the central release device 10, the cross slide 28 is pushed through between the coils of the spring 24 into the annular gap 82 between the housing 12 and the sliding sleeve 60 until the fitting bevels 94 at the arm ends 92 of the cross slide 28 come to lie against the outer circumferential face 56 of the sleeve portion 54. If the cross slide 28 is pushed further in the direction of the longitudinal axis of the central release device 10, the arms 86 are temporarily spread apart and snap together again behind the outer circumferential face 56 of the sleeve portion 54, so that the cross slide 28 is secured positively and non-positively in the radial direction with the part-cylindrical inner circumferential face 90 lying against the outer circumferential face 56 of the sleeve portion 54. Viewed in the axial direction of the central release device 10, the cross slide 28 now prevents the housing 12 from moving away from the flange 14 of the sleeve 16 against the force of the spring 24 beyond a predetermined amount. Should an attempt be made to push the housing 12 away from the flange 14 of the sleeve 16 against the force of the spring 24, the housing 12 will come to lie with the annular face 52 of the wall portion 30 against the cross slide 28, which in turn is supported via the plane annular face 96, turned towards the cross slide 28, of the sliding sleeve 60 and the offset 72 of the sliding sleeve 60 against the sheet-metal ring 64 attached to the collar 62 of the sleeve portion 54 of the sleeve 16.

The process of dismounting the cross slide 28, which is of course necessary to operate the central release device 10, as the sliding sleeve 60 must then move into the through-bore 32 in the housing 12 in order to be connected for operation to the annular piston 20, takes place analogously in the opposite direction.

The actual hydraulic operation of the central release device 10 when this is mounted in the motor vehicle is sufficiently known. A description in this respect will not therefore be given at this point.

It is obvious to the person skilled in the art that the predetermined amount by which the housing 12 can move away from the flange 14 of the sleeve 16 when the central release device 10 is in the non-mounted state until it is prevented from moving further by the cross slide 28 can be appropriately set without any problems on the basis of the design, i.e. through an appropriate choice of thickness for the cross slide 28 and/or by appropriately setting the width y of the annular gap 82, which can easily be achieved through an appropriate choice of axial length for the housing 12, the sleeve 16 and/or the sliding sleeve 60. The predetermined amount by which the housing 12 can move away from the flange 14 of the sleeve 16 when the central release device 10 is in the non-mounted state should in this case preferably be less than or equal to the depth x of the annular groove 48 in order to prevent the seal 26 from sliding out of the annular groove 48 in the housing 12. This predetermined amount may of course also be nearly zero, so that there is essentially no possibility of any further relative movement between the housing 12 and the sleeve 16 when the cross slide 28 is fitted.

The process of securing the cross slide 28 positively and non-positively at the sleeve 16 in the annular gap 82 between the housing 12 and the sliding sleeve 60 was described in relation to the above embodiment. It is, however, equally possible for the cross slide 28 to be secured positively and non-positively at the sliding sleeve 60 in a groove (not represented) made in the outer circumference of the sliding sleeve 60 or at an offset (not represented) made at the outer circumference of the sliding sleeve 60, which would be an option in a structural development of the central release device 10 in which the sliding sleeve 60 also enters the through-bore 32 in the housing 12 when the central release device 10 is in the basic position. Also conceivable is a structural development in which the cross slide 28 is secured positively and non-positively at the housing 12 in a groove (not represented) made in the outer circumference of the housing 12 or at an offset (not represented) made at the outer circumference of the housing 12 and then forms a stop face for a protective sleeve (not represented), preferably of a plastics material, which is attached to the sliding sleeve 60 and surrounds the housing 12 telescopically, or for a lengthened abutment (not represented), which is attached to the sliding sleeve 60 or the release bearing 22, for the spring 24.

The invention discloses a central release device for a hydraulic clutch actuation system for motor vehicles, with a housing and a sleeve provided with a flange, which together define a pressure chamber for accommodating an annular piston, by means of which a release bearing guided on the sleeve can be displaced. A spring, which braces the housing and the release bearing apart, subjects the housing to a force directed at the flange. A seal is also provided between the housing and the flange to seal off the pressure chamber. According to the invention, a retaining element, which can be detached to operate the central release device, is provided which, when the central release device is in the non-mounted state, forms a stop for the housing and prevents this alone from moving against the force of the spring away from the flange of the sleeve beyond a predetermined amount. The result is a simply constructed central release device which, compared with the prior art, can be produced more conveniently without the risk of functional problems.

Whilst the invention has been described and illustrated by way of a preferred embodiment of the invention, it will be understood to those skilled in the art that various changes in form and detail may be made without departing from the spirit and scope of the invention as defined in the appended claims.

LIST OF REFERENCE CHARACTERS 10 central release device
12 housing
14 flange
16 sleeve
18 pressure chamber
20 annular piston
22 release bearing
24 spring
26 seal
28 cross slide
30 wall portion
32 through-bore
34 attachment flange
36 attachment eye
38 hydraulic connection
40 end face
42 centring counterbore
44 circumferential face
46 end face
48 annular groove
50 abutment
52 annular face
54 sleeve portion
56 outer circumferential face
58 sealing element
60 sliding sleeve
62 collar
64 sheet-metal ring
66 stepped through-bore 68 portion of a smaller diameter
70 portion of a greater diameter
72 offset
74 inner race
76 shoulder
78 retaining ring
80 abutment
82 annular gap
84 handle part
86 arm
88 profile
90 part-cylindrical inner circumferential face
92 arm ends
94 fitting bevel
96 annular face
a clearance between arm ends 92
d diameter of inner circumferential face 90
x depth of annular groove 48
y width of annular gap 82

What is claimed is:

1. Central release device for a hydraulic clutch actuation system, with a housing and a sleeve provided with a flange, which together define a pressure chamber for accommodating an annular piston, by means of which a release bearing guided on the sleeve can be displaced, wherein a spring, which braces the housing and the release bearing apart, subjects the housing to a force directed at the flange, and a seal is provided between the housing and the flange to seal off the pressure chamber, where there is a retaining element, which can be detached to operate the central release device and which, when the central release device is in the non-mounted state, forms a stop for the housing and prevents the housing alone from moving against the force of the spring away from the flange of the sleeve beyond a predetermined amount.

2. Central release device according to claim 1, wherein the housing is provided at its end face which is turned towards the flange of the sleeve or the flange of the sleeve is provided at its end face which is turned towards the housing with an annular groove which accommodates the seal, the thickness of which is greater in the non-deformed state than the depth (x) of the annular groove, wherein the predetermined amount by which the housing can move away from the flange of the sleeve when the central release device is in the non-mounted state is less than or equal to the depth (x) of the annular groove.

3. Central release device according to claim 1, wherein the release bearing is guided on the sleeve by a sliding sleeve, which is held at the sleeve by means of a stop, wherein the retaining element is formed as a cross slide, which can be secured positively and non-positively at the sleeve in an annular gap between the sliding sleeve and the housing.

4. Central release device according to claim 3, wherein the cross slide comprises a handle part from which two arms extend which, viewed in a plan view, essentially form a C shape.

5. Central release device according to claim 4, wherein the handle faces of the handle part are each provided with a profile.

6. Central release device according to claim 4, wherein the arms can spring out elastically and comprise a part-cylindrical inner circumferential face, wherein the clearance (a) between the arm ends is slightly smaller than the diameter (d) of the part-cylindrical inner circumferential face, so that the cross slide engages behind the sleeve, the sliding sleeve or the housing like a snap connection in the mounted state.

7. Central release device according to claim 4, wherein the arm ends are provided at the sides which are turned towards one another with a respective fitting bevel.

8. Central release device according to claim 1, wherein the release bearing is guided on the sleeve by a sliding sleeve, which is held at the sleeve by means of a stop, wherein the retaining element is formed as a cross slide, which can be secured positively and non-positively at the sliding sleeve in a groove made in the outer circumference of the sliding sleeve or at an offset made at the outer circumference of the sliding sleeve.

9. Central release device according to claim 1, wherein the release being is guided on the sleeve by a sliding sleeve, which is held at the sleeve by means of a stop, wherein the retaining clement is formed as a cross slide, which can be secured positively and non-positively at the housing in a groove made in the outer circumference of the housing or at an offset made at the outer circumference of the housing and comprises a stop face for an abutment, attached to the sliding sleeve, for the spring.

10. Central release device according to claim 1, wherein the retaining element or cross slide consists of a plastics material.

11. Central release device according to claim 1, wherein the housing consists of a plastics material and the sleeve of steel.

* * * * *